Sept. 2, 1958  R. L. JAESCHKE  2,850,654
CONTROL FOR ELECTROMAGNETIC COUPLING
Filed Feb. 1, 1956
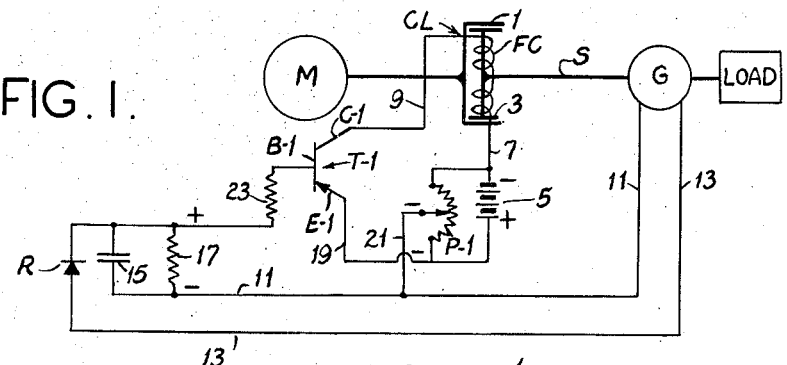
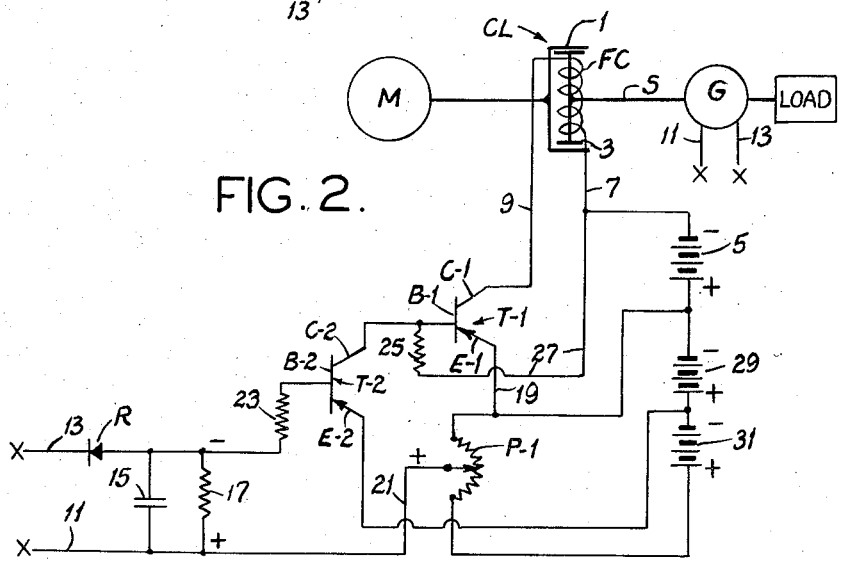
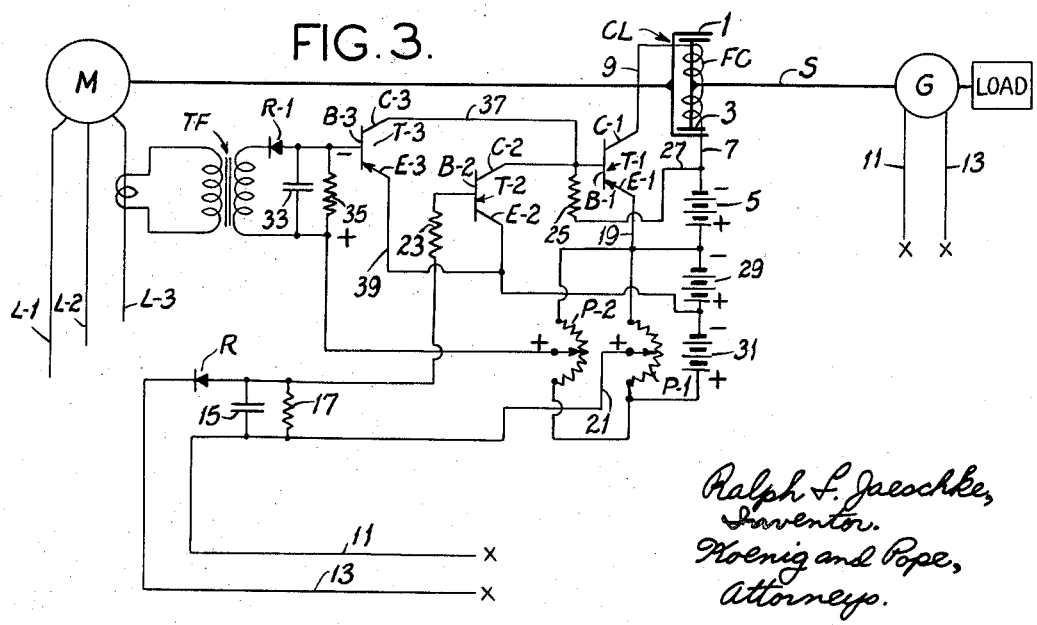
Ralph L. Jaeschke,
Inventor.
Koenig and Pope,
Attorneys.

United States Patent Office 2,850,654
Patented Sept. 2, 1958

2,850,654

CONTROL FOR ELECTROMAGNETIC COUPLING

Ralph L. Jaeschke, Kenosha, Wis., assignor to Eaton Manufacturing Company, Cleveland, Ohio, a corporation of Ohio Application February 1, 1956, Serial No. 562,695

13 Claims. (Cl. 310—94)

This invention relates to a control and more particularly to a control for electrical coupling apparatus.

Among the several objects of this invention may be noted the provision of a speed regulating control of electromagnetic couplings such as clutches, brakes, dynamometers, and the like; the provision of a control of the class described which maintains the speed at any preset level with protection against excessive torque demands or within any predetermined torque limits; the provision of such a control which requires no warm-up and which is substantially instaneous in operation; and the provision of a control for electromagnetic couplings which is mechanically rugged, compact in size, reliable in operation and economical. Other objects and features will be in part apparent and in part pointed out hereinafter.

In its broader aspects the invention is directed to a control for electromagnetic coupling apparatus which has a rotating shaft and a D. C. field coil for varying the shaft speed. The control includes a transistor which has a collector, an emitter and a base, and an electrical generator, or similar means, responsive to the rotation of the shaft to supply a D. C. potential component proportional to the shaft's angular velocity. The collector-emitter circuit includes the field coil series-connected with a D. C. power source. A composite potential source, which includes said D. C. potential component, supplies a reversible D. C. potential to the base-emitter circuit. The flow of current in the field coil is, therefore, responsive to the angular velocity of the shaft, thus controlling the shaft speed. Additionally, means are provided to adjust and maintain the speed at any of a number of predetermined values and to establish a preset torque limit which is not to be exceeded.

The invention accordingly comprises the constructions hereinafter described, the scope of the invention being indicated in the following claims.

In the accompanying drawings, in which several of various possible embodiments of the invention are illustrated, Fig. 1 is a schematic diagram of one embodiment of the present invention;

Fig. 2 is a schematic representation of a first alternative embodiment; and,

Fig. 3 shows a schematic diagram of a third embodiment of the invention.

Corresponding reference characters indicate corresponding parts throughout the several views of the drawings.

Referring now to Fig. 1, electromagnetic coupling apparatus is indicated at reference character CL. This apparatus includes a driving member 1 energized by an electric motor M, and a driven member 3 by which torque is transferred through a shaft S to a load. An electrical generator G is driven by shaft S, thereby developing an electrical potential which is the function of the angular velocity of the shaft S. Generator G is preferably an A. C. permanent-magnet alternator. The degree of coupling between members 1 and 3 is varied by the current flow through a clutch field coil FC.

A transistor T-1, preferably of the junction type, is shown to include three elements, a collector C-1, an emitter E-1 and a base B-1. These transistor elements are connected in two circuits so as to constitute a common-emitter configuration. The first circuit interconnects the collector C-1 and emitter E-1 and includes coil FC series-connected with a D. C. power source 5 by means of wires 7 and 9. A second circuit is connected between the base and emitter to apply a composite D. C. reversible potential across these two transistor elements. The first component of this composite D. C. potential is produced by interconnecting the A. C. output of generator G via wires 11 and 13 to a half-wave rectifier unit made up of a rectifier R, a condenser 15 and a resistor 17. The second component of this composite base-emitter potential is applied across wires 19 and 21 and is produced by connecting a potentiometer P-1 across battery 5. This second D. C. potential is adjustable by movement of the arm of potentiometer P-1. As indicated in Fig. 1, the polarities of these two potentials which make up the composite base-emitter potential are connected in opposition so that the base may be biased to reverse the direction of current flow through base B-1, depending on the relative magnitudes of the potential component developed by generator G and that established by adjustment of the potentiometer. The base-emitter circuit also includes a current-limiting resistor 23 to prevent excessive current from flowing therein.

Operation is as follows:

Assuming as initial conditions that shaft S is at rest and motor M is energized so as to drive member 1, the positioning of the arm of potentiometer P-1 at midpoint will impress a D. C. potential of approximately one half that of the power source 5 across the base-emitter circuit with base B-1 biased in a negative direction with respect to the emitter E-1. This causes current to flow in the base-emitter circuit and the resulting current which is thereby caused to flow in the collector-emitter circuit will fully energize field coil FC and couple shaft S and the load to motor M. As the driven member 3 and shaft S move and the angular velocity increases, the D. C. potential component produced by generator G increases. As the polarity of this latter component opposes that established by the arm of potentiometer P-1, the negative bias on base B-1 is decreased until a steady state of operation results with the value of the field coil current at a predetermined level and the speed at a corresponding value. Any incipient variation in load conditions will be reflected to the base-emitter circuit as increased or decreased base current and thereby increase or decrease the degree of coupling accordingly so as to maintain automatically the angular velocity of the driven member and shaft substantially constant at the preestablished level determined by the setting of the arm of potentiometer P-1. Variation in the speed of shaft S to a higher or lower controlled preset value can be accomplished merely by a corresponding adjustment of this potentiometer arm.

The control illustrated in Fig. 2 is similar to that of Fig. 1, differing principally in the employment of a second transistor stage, and in the inclusion of additional power and biasing potential sources. The transistor stage which powers the field coil FC has its base B-1 connected to a collector C-2 of a transistor T-2 rather than to the rectifier unit associated with generator G. Base B-1 is also connected to the negative terminal of battery 5 through a load resistor 25 and a wire 27. The collector-emitter circuit of the T-2 transistor stage includes as a second power and biasing potential source a battery 29. Potentiometer P-1 is connected across battery 29 and another battery 31 which are series-connected. As in Fig. 1, the A. C. output of generator G is rectified and the resulting D. C. potential component is applied, together with the D. C. potential established by adjustment of the arm of potentiometer P–1 as a composite reversible D. C. potential to the base-emitter circuit of the transistor (T–2 in this instance).

Operation of the Fig. 2 embodiment of the present invention is analogous to that previously set forth with regard to Fig. 1. Differences exist, however, as to several aspects. The base-emitter composite reversible D. C. potential of transistor T–1 in Fig. 2 includes a potential across resistor 25 rather than being directly connected to the rectified output of generator G. The function is, of course, the same, but the action is indirectly, rather than directly, responsive to the output of generator G. Thus, as the speed of the generator G increases in Fig. 2, the base B–2 is made more negative (rather than more positive as in Fig. 1). This causes increased conductance in the collector-emitter circuit of T–2, thereby increasing the curent flow through resistor 25. This modifies the bias on base B–1, causing decreased current flow in the T–1 collector-emitter circuit and coil FC. The functional advantage of the Fig. 2 embodiment is that the control current resulting from the composite potential produced by generator G and potentiometer P–1 may be considerably smaller in Fig. 2 because of the amplification due to the second transistor stage.

The third embodiment, which is illustrated in Fig. 3, is identical to that of Fig. 2, except that a torque limiting feature is included. In order to accomplish this, a third transistor T–3 is employed by connecting its collector-emitter circuit in shunt with that of the second transistor T–2. The base-emitter circuit of T–3 has supplied to it another reversible D. C. composite potential. This potential is made up of an adjustable D. C. potential supplied by positioning the arm of a potentiometer P–2 (which is shunt-connected with P–1 across batteries 29 and 31) and a D. C. potential proportional to the A. C. current drawn motor M. One of the three phases of the A. C. power source, indicated at L–1, L–2, L–3, is used as a sensing medium, so that the increase or decrease in motor current is coupled by a current transformer TF through a half-wave rectifier unit (including a condenser 33, a resistor 35 and a rectifier R–1) to the base-emitter circuit of T–3.

The operation of the Fig. 3 control follows that of Fig. 2 to the extent of maintaining the shaft speed at a predetermined value. However, the Fig. 3 embodiment provides a further safeguard in that if decrease of shaft speed is due to a load demand which exceeds the capacity of the motor M, then the current through field coil FC is increased only to the extent of the torque capacity of the motor M. This is accomplished by applying the resultant of the rectified A. C. potential component supplied by transformer TF and the D. C. potential across potentiometer P–2 to the base-emitter circuit of transistor T–3. Any load increase coupled through clutch CL demands the delivery of increased torque by motor M. This in turn causes an increase in power drawn from lines L–1, L–2, L–3, which is reflected as an increase of bias in a negative direction at base B–3. The resultant curernt flow in the T–3 base-emitter circuit causes an increase in current flow in the collector-emitter circuit of T–3, thus introducing a third D. C. potential to the composite potential applied to the base-emitter circuit of transistor T–1. This third potential increases the positive bias on base B–1, thereby tending to decrease the coupling of clutch CL and prevent further loading of motor M past the established torque level. The particular torque limit which is to be established is preset by adjustment of the arm of potentiometer P–2.

It is to be understood that this control is applicable to all types of electromagnetic apparatus in which the degree of coupling is a function of current flow through a field coil. Thus, braking and dynamometer devices may be controlled effectively by the device of the present invention. Also, in some instances, as for example in certain brake applications, it may be desirable to increase, rather than decrease, the current flow through the field coil in response to incipient shaft speed increases. Moreover, the electromagnetic coupling controlled herein may also be of the eddy-current type, or of the magnetic fluid type, or others operating upon the principle that the mechanical driving forces are functions of applied electrical or electromagnetic forces.

It will be noted that, although the transistors illustrated in the drawings are of the PNP type, the NPN type may be used interchangeably if the polarities of the power sources, etc., are correspondingly reversed. Also, D. C. generators are the equivalent of the A. C. alternator G and the associated rectifier components, and may be substituted if desired. Similarly, the power and potential sources illustrated as batteries may in every instance be replaced with A. C. sources and rectifiers.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A control for electrical coupling apparatus having a rotating shaft and a D. C. field coil for varying the speed of the shaft, comprising a transistor having a collector, an emitter, and a base, means responsive to rotation of said shaft to supply a D. C. potential component proportional to the angular velocity of said shaft, a collector-emitter circuit including a D. C. power source and said field coil connected in series, a base-emitter circuit, and a composite D. C. potential source including said D. C. potential component adapted to supply a reversible potential to said base-emitter circuit whereby the flow of current in said field coil is responsive to the angular velocity of said shaft.

2. A control as set forth in claim 1 in which said means for supplying said D. C. potential component comprises an electrical generator driven by said shaft.

3. A control as set forth in claim 1 in which said composite D. C. potential source also includes a first D. C. potential source which may be varied to adjust the angular velocity of said shaft to any of a number of predetermined values.

4. A control as set forth in claim 1 which further includes means for supplying another D. C. potential component responsive to the torque transmitted by said coupling whereby the torque transferred by said coupling is limited to a predetermined value.

5. A control for electromagnetic coupling apparatus having a rotating shaft and a D. C. field coil for varying the speed of the shaft, comprising first and second transistors each having a collector, an emitter, and a base, means responsive to rotation of said shaft to supply a D. C. potential component proportional to the angular velocity of said shaft, a collector-emitter circuit for said first transistor including a first D. C. power source and said field coil connected in series, a base-emitter circuit for said first transistor including a resistance and a first D. C. potential source connected in series adapted to supply a composite reversible potential to said base-emitter circuit, a collector-emitter circuit for said second transistor including said resistance and a second source of D. C. power connected in series, and a base-emitter circuit for said second transistor including a second D. C. potential source connected in series opposition with said D. C. potential component and adapted to supply a composite reversible potential to said second transistor base-emitter circuit whereby the flow of current in said field coil is responsive to the angular velocity of said shaft.

6. A control as set forth in claim 5 in which said means for supplying said D. C. potential component comprises an electrical generator driven by said shaft.

7. A control as set forth in claim 5 in which said second D. C. potential source may be varied to adjust the angular velocity of said shaft to any of a number of predetermined values.

8. A control as set forth in claim 5 which further includes means for supplying to said first transistor base-emitter circuit another D. C. potential component responsive to the torque transmitted by said coupling whereby the torque transferred through said coupling is limited to a predetermined value.

9. A control for electromagnetic clutch apparatus having an electric motor connected to a driving member, a driven member, and a D. C. field coil for varying the degree of coupling between said members, comprising first, second and third transistors each having a collector, an emitter, and a base, means responsive to rotation of said driven member to supply a first D. C. potential component proportional to the angular velocity of said driven member, means for supplying a second D. C. potential component responsive to the torque transmitted by said coupling, a collector-emitter circuit for said first transistor including a first D. C. power source and said field coil connected in series, a base-emitter circuit for said first transistor including a resistor and a first D. C. potential source connected in series adapted to supply a composite reversible potential to said base-emitter circuit, a collector-emitter circuit for said second transistor including said resistor and a second source of D. C. power connected in series, a base-emitter circuit for said second transistor including a second D. C. potential source connected in series opposition with said first D. C. potential component and adapted to supply a composite reversible potential to said second transistor base-emitter circuit whereby the flow of current in said field coil is responsive to the angular velocity of said driven member, a collector-emitter circuit for said third transistor shunt-connected with said second transistor collector-emitter circuit, a base-emitter circuit for said third transistor, and a composite D. C. potential source including said second D. C. potential component adapted to supply a reversible potential to said third transistor base-emitter circuit whereby the field coil current is responsive to the shaft speed below a predetermined maximum value of torque transfer.

10. A control as set forth in claim 9 in which said means for supplying said first D. C. potential component comprises an electrical generator driven by said driven member.

11. A control as set forth in claim 10 in which said means for supplying said second D. C. potential component comprises a current transformer connected between said electric motor and an A. C. power source therefor.

12. A control as set forth in claim 9 in which said second D. C. potential source may be varied to adjust the angular velocity of said driven member to any of a number of predetermined values.

13. A control as set forth in claim 12 which further includes a fourth D. C. potential source connected in said third transistor base-emitter circuit and which may be varied to establish different predetermined torque transfer limits.

References Cited in the file of this patent
UNITED STATES PATENTS

| | | |
|---|---|---|
| 2,277,284 | Winther | Mar. 24, 1942 |
| 2,748,299 | Weesner | May 29, 1956 |

OTHER REFERENCES

Transistors and Their Applications, Louis E. Garner, Jr., published by Coyne Elec. School, Chicago, Illinois, 1953, pages 37 and 38.